US006622207B1

(12) United States Patent
Rossum

(10) Patent No.: US 6,622,207 B1
(45) **Date of Patent: *Sep. 16, 2003**

(54) INTERPOLATION LOOPING OF PRIORITIZED AUDIO SAMPLES IN CACHE CONNECTED TO SYSTEM BUS

(75) Inventor: David P. Rossum, Monterey, CA (US)

(73) Assignee: Creative Technology Ltd., Creative Resource (SG)

( * ) Notice: Subject to any disclaimer, the term of this patent is extended or adjusted under 35 U.S.C. 154(b) by 244 days.

This patent is subject to a terminal disclaimer.

(21) Appl. No.: 09/654,969

(22) Filed: Sep. 5, 2000

Related U.S. Application Data

(63) Continuation of application No. 08/971,238, filed on Nov. 15, 1997, now Pat. No. 6,138,207.

(51) Int. Cl.$^{7}$ .................................................. G06F 12/00
(52) U.S. Cl. ........................ 711/118; 711/123; 711/126; 711/147; 711/151; 711/158
(58) Field of Search ................................ 711/118, 123, 711/126, 158, 147, 151; 84/603; 708/290

(56) References Cited

U.S. PATENT DOCUMENTS 5,111,727 A * 5/1992 Rossum ...................... 708/290
5,342,990 A * 8/1994 Rossum ...................... 708/290
5,698,803 A * 12/1997 Rossum ...................... 708/290
5,748,921 A * 5/1998 Lambrecht et al. ......... 710/309
5,918,302 A * 6/1999 Rinn ........................... 84/604
5,925,841 A * 7/1999 Rossum ...................... 708/290
6,138,207 A * 10/2000 Rossum ...................... 711/118

* cited by examiner

*Primary Examiner*—Than Nguyen
(74) *Attorney, Agent, or Firm*—Blakely, Sokoloff, Taylor & Zafman LLP

(57) ABSTRACT

A cache memory is updated with audio samples in a manner which minimizes system bus bandwidth and cache size requirements. The end of a loop is used to truncate a normal cache request to exactly what is needed. A channel with a loopEnd in a request will be given higher priority in a two-stage priority scheme. The requested data is conformed by trimming to the minimum data block size of the bus, such a doubleword for a PCI bus. The audio data written into the cache can be shifted on a byte-wise basis, and unneeded bytes can be blocked and not written. Request data for which a bus request has been issued can be preempted by request data attaining a higher priority before a bus grant is received.

9 Claims, 6 Drawing Sheets

PRIORITY QUEUE

| | CHANNEL | PRIORITY |
|---|---|---|
| 0 | | 00 |
| 1 | 11 | 00 |
| 2 | 51 | 01 |
| 3 | 18 | 10 |
| 4 | 42 | 10 |
| 5 | 15 | 10 |
| 6 | 36 | 11 |
| 7 | 63 | 11 |

*FIG. 5.*

INTERPOLATION LOOPING OF PRIORITIZED AUDIO SAMPLES IN CACHE CONNECTED TO SYSTEM BUS

CROSS-REFERENCE TO RELATED APPLICATIONS

This application is continuation of and claims the benefit of U.S. application Ser. No. 08/971,238, filed Nov. 15, 1997, now U.S. Pat. No. 6,138,207, the disclosure of which is incorporated herein by reference.

BACKGROUND OF THE INVENTION

The present invention relates to storing and playing digital audio recordings, which are collections of digital audio sample points (or samples), and in particular to looping techniques, use of cache memory and interfacing with a sample memory over a system bus.

Audio boards have been developed for computer systems which can simultaneously handle multiple channels of audio. The multiple channels may correspond to different instruments in a band, voice, etc. For any particular audio recording, multiple versions could be stored at different pitches or keys. In order to minimize the memory requirements, instead of storing all the various pitches, a single audio recording can be stored, and shifted upon playback to produce the desired pitch. This shifting is done by interpolating between an audio sample and at least a previous or next audio sample to produce the shifted audio output sample.

A technique which has been implemented in audio boards to speed up processing is the use of a cache memory. Unlike a standard cache memory used with a microprocessor for general processing, an audio sample cache memory requires more predictability regarding the data that will be needed. With multiple audio channels, there is a trade-off between the size of the cache memory and having sufficient data so that any channel doesn't run out of audio data during a realtime playback.

One technique which will occur in music generation is "looping", in which the same portion of an audio recording is repeated. The occurrence of looping can cause a discontinuity in the data required for a cache memory, since instead of sequential fetching, a jump is required. A number of techniques have been developed in the past to handle this. In one technique, two portions of the cache are used, one for the data at the start of the loop, and another for current data. Thus, the loop start data is always available. In other methods, data from outside the loop boundaries is fetched. In addition, the loop may be required to have identical levels at the start and end of the loop to avoid discontinuities, or the end of the loop could be reproduced in the start loop portion of the cache. Clearly, such techniques have disadvantages such as requiring a much larger cache memory, particularly for a large number of channels, or requiring modification of the playback data for a large number of possible sounds to be played.

The use of an audio memory on an audio board can make the audio board expensive, and can duplicate memory which will already be in a computer system in its main memory. Thus, it is desirable to have an audio board be able to share the main memory of the computer system, rather than having its own dedicated memory. However, in order to maintain realtime audio playback capability over multiple channels, the bandwidth of the system bus becomes a concern. The storing of more data than necessary in the cache requires that the data be accessed at some point over the system bus, increasing the bus bandwidth demands, and potentially slowing performance.

Additionally, a typical system bus will have a fixed minimum block size which may not match the data block size required for audio. For example, the PCI bus transfers data in doublewords, which consist of 4 bytes. However, some audio data is specified with byte level addresses, and thus, in any particular doubleword addressed in main memory, the audio recording may start at the first byte, second, third, or fourth. Thus, one, two, or three of the bytes transferred might be unnecessary for the desired audio recording. Typical cache memory systems in a microprocessor treat this as a necessary evil, and will transfer a line into the cache, which may include a large number of data not required, but is done to minimize the number of transfers over the bus and the overhead required with such a transfer.

In U.S. Pat. Nos. 5,111,727 and 5,342,990, the techniques for utilizing a cache memory in multichannel interpolative digital audio playback are disclosed. Note that there are several arbitrary design variables, in particular the interpolation order N and the number of channels L.

If the mechanism of looping is examined closely with respect to these disclosures, it will be apparent that when a loop occurs, the contents of the cache may vary depending on the history of the value of the phase increment. In particular, it can be seen that if the phase increment is smaller than unity, then when the current address exceeds the loop end address, it will do so by less than one memory location. In this case, the loop will occur immediately. However, if the phase increment exceeds one, then when the current address first exceeds the loop end address, it may do so by less or more than one memory location depending on the exact history of the value of the current address and the phase increment. If the cache is being filled with data fetched from main waveform memory at a location based on the current address at the time the memory fetch occurred, this means that the location from which data in the cache near the loop point has been fetched may come from waveform memory just below the loop end address or from just below the loop start address. This places a restriction, albeit a minor one, on the audio data. The data near the start of the loop and near the end of the loop must be identical (or virtually identical) for there to be no audio consequence of this variation in fetch location. Because the loop is expected to be audibly smooth, this identity is a desirable situation in any event, and causes few difficulties.

However, a more serious consequence of this situation is the fact that the data in the cache is not guaranteed to be fetched from the set of data points within the loop. Consider the case when the current address has just jumped back to the start of the loop. In this case, using the techniques described in '990, if a cache service request occurs at this time, data will be placed in the cache starting from the current address, and descending in address. Should the cache size be large, the data would be fetched from locations below the loop start address.

This is not a problem in general for music synthesis, but it presents problems if the data in the main waveform memory is continually being updated. In this case, it is desirable to cause the current address to loop, but continuous audio data is written into the memory defined by the loop. It can easily be seen that if the mechanism described in the '990 patent is used, then some number of audio words will need to be written both just below the end of the loop and below the start point. This inconvenience is eliminated by the current invention.

SUMMARY OF THE INVENTION

The present invention provides a method and apparatus for maximizing cache usage and minimizing system bus bandwidth for a digital audio system. Rather than store duplicate data to deal with the end of a loop, the present invention provides a mechanism for precisely determining the data required in advance, essentially splicing the end and beginning of the loop together. A "cache invalid size" parameter is updated for each channel to indicate the number of cache memory locations no longer required, which thus need to be refilled with new data. The channel is examined to see if an end of a loop occurs within the range of a next group of samples to be fetched corresponding to the cache invalid size. If an end of loop occurs, data is fetched only up to the loop end. Subsequent data is fetched from a loop start address.

In one embodiment, the occurrence of a loop end address will provide a channel with a higher priority level in a first stage of a two-stage priority assigning mechanism. The second stage will assign a priority code based on the number of sound samples needed. If there is a higher priority due to a loop in the first stage, the second stage will provide a more urgent priority code with fewer samples than would be required for a no-loop channel (unless both cases are at maximum urgency). Thus, the present invention provides quicker access to a channel with an upcoming loop end, thus ensuring that its next request which would include the loop start will arrive more quickly to the priority logic, since the entire cache invalid size has not been filled.

In one embodiment, the present invention also makes better use of bus requests to ensure that unneeded data is not fetched. This is done by modifying a last main memory address in a data block if the end of the data request falls within the middle of a doubleword. The request is trimmed so that the last audio sample requested is a full doubleword. The partial data of the next doubleword will then wait for the next request, in which the rest of the doubleword can also be specified.

In one embodiment, the present invention also includes a cache control circuit which enables the shifting of bytes recovered from the system bus to write them in the appropriate location in the cache memory, preferrably with a barrel shifter. In addition, any particular byte can be inhibited from being written to cover the situation where the beginning or end of an audio recording in main memory is in the middle of a doubleword, and accordingly, of necessity, a portion of the received doubleword will be unneeded data.

In yet another embodiment, a set of request parameters for a first channel needing updating are generated in accordance with a priority scheme. A bus request is issued for the set of request parameters. If a second channel attains higher priority between the time the bus request is issued and access to the bus is granted, a set of request parameters for the second channel is substituted for the pending request parameters.

For a further understanding of the nature and advantages of the invention, reference should be made to the following description taken in conjunction with the accompanying drawings.

BRIEF DESCRIPTION OF THE DRAWINGS

FIG. 5 is a diagram of a priorityQueue according to the present invention.

DETAILED DESCRIPTION OF THE INVENTION

Overall System

Figure 1:
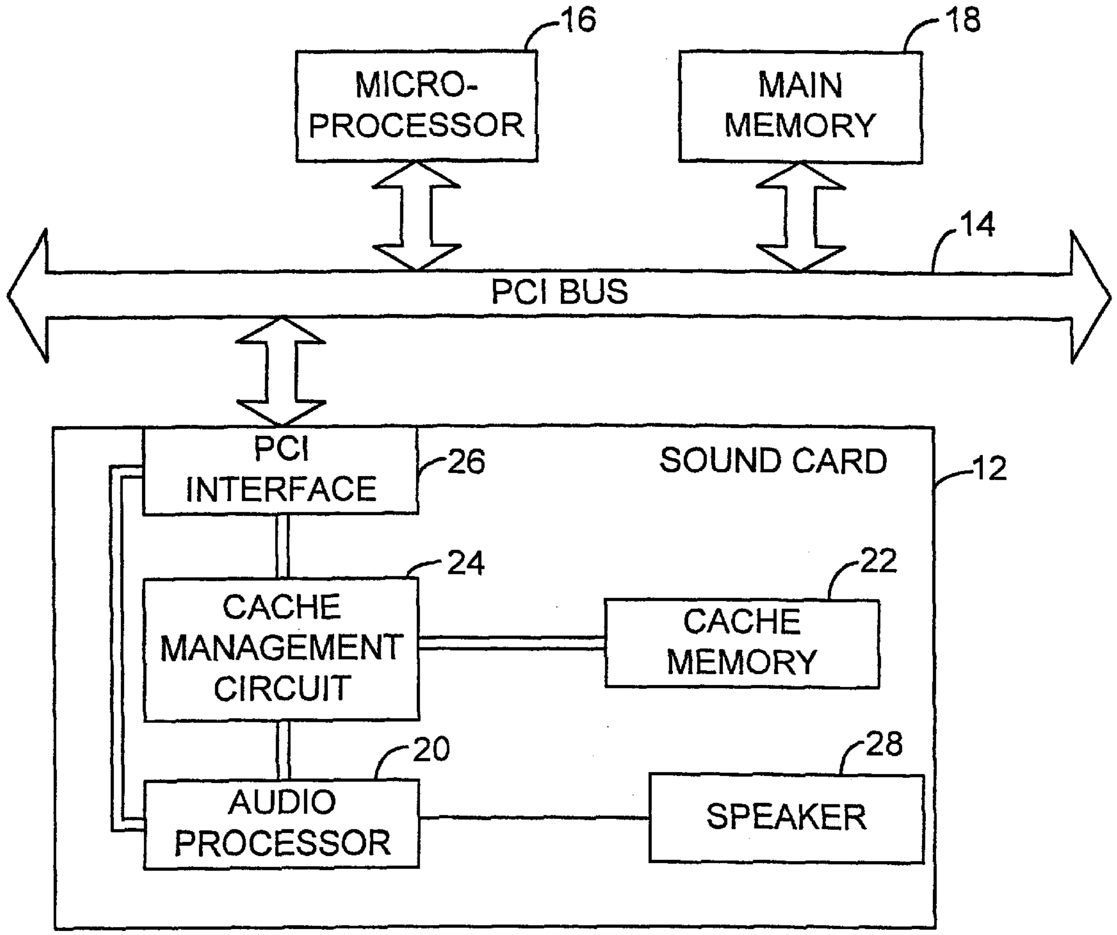
FIG. 1 is a block diagram of a computer system incorporating the present invention.

FIG. 1 illustrates a computer system 10 according to the present invention. A sound board 12 is connected to a PCI bus 14, which is also connected to a host microprocessor 16 and main memory 18. Soundcard 12 includes its own audio processor 20 and a cache memory 22 for storing audio samples. Cache memory 22 is controlled by cache management logic 24, which interfaces with main memory 18 over PCI bus 14 using PCI interface logic 26. The audio processor 20 could simply process and replace the data, copy it, or could play it over a speaker 28.

Figure 2:
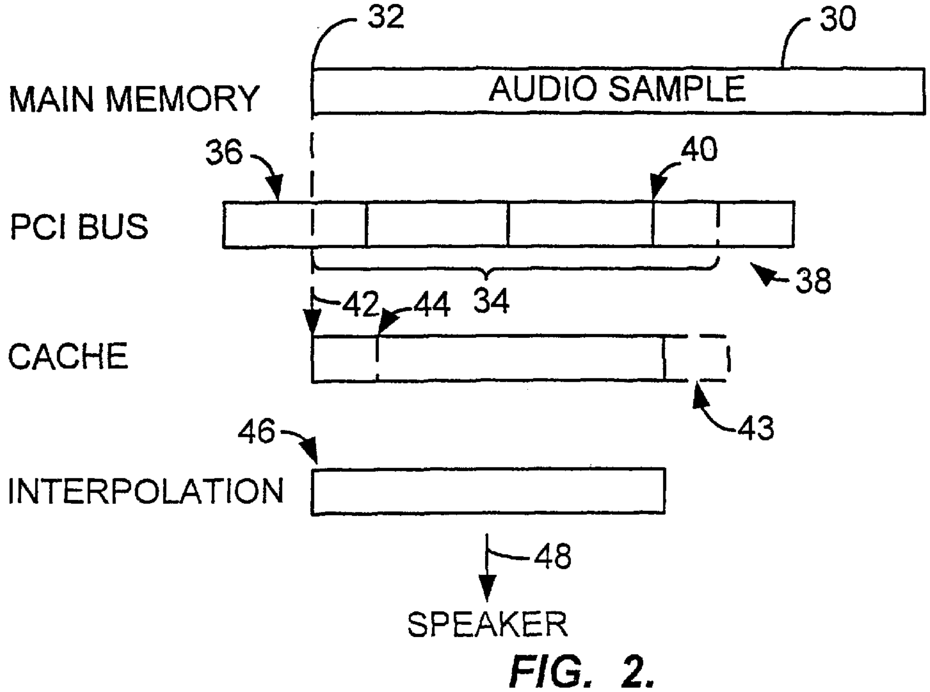
FIG. 2 is a diagram illustrating the movement of data from main memory to playback.

FIG. 2 illustrates the movement of data from main memory 18 to speaker 28 in one example. An audio recording 30 in main memory is illustrated, having a starting address 32. A portion of the cache memory 22 which has already been played, and thus needs to be refilled, is designated as a cacheInvalidSize. This cacheinvalid size is translated into a requested group of audio samples 34, which needs to be requested from main memory 18 over PCI bus 14. In the illustration shown, requested group of audio samples 34 begins in the middle of a first doubleword 36, and ends in the middle of a double word 38. Since transfers over the PCI bus are required to be in doublewords, this could result in bandwidth being used for unneeded data. Although the use of this bandwidth is unavoidable for doubleword 36, it is avoided for doubleword 38 by trimming the data request 34 to end at a point 40, with the excess in doubleword 38 being saved for the next request when the entire doubleword can be used.

When the doublewords are received by audio card 12, cache management logic 24 is responsible for writing them into the cache memory. This is done by shifting the bytes and enabling only certain bytes of doubleword 36, so that only the portion starting at address 42, corresponding to the start of the recording, is actually stored in the cache. Thus, the excess data fetched in the first doubleword 36 is discarded and neither wastes space in the cache nor is erroneously played as the data in the cache is processed.

Upon actual playback through speaker 28, the desired audio recording may in fact have started at a point 44. Thus, only the sample data from point 44 onward is actually needed. The portion between address 42 and address 44 is included in case the playback requires a pitch shift. This portion represents the amount of data prior to the data at address 44 required for interpolation of the first sample. A pitch shift would involve interpolation of the sample to provide a pitch shifted sample, and may require for the interpolation data before (between 42 and 44) and after (43) the desired audio sample. This interpolation is done by audio processor 20, which provides an interpolated, pitch-shifted audio sample 46 to speaker 28 at step 48.

The current invention consists of a waveform memory which contains audio recordings comprised of individual data points called samples. In the preferred embodiment, these samples can be either 8 bit bytes or 16 bit words, and the recordings can be either a monophonic audio stream or an interleaved stereo stream of data. The waveform memory is addressed by controlling software as samples, and thus the actual byte address of the data in the memory depends on the size of the samples. If the samples are monophonic bytes, then the byte address is the sample address. If the samples are either stereo interleaved bytes or monophonic words, then the byte address is twice the sample address. If the samples are stereo interleaved words, then the byte address is four times the sample address.

To understand the current invention, certain terms must first be carefully defined.

Definitions

The currentInterpolationBase is the lowest waveform memory sample which will be used by the interpolator to compute the value of the audio output.

The sizeOfCache is the size, in audio samples, of the cache memory.

The currentAddr is defined as the sample address one sizeOfCache beyond the currentInterpolationBase.

The cacheReadAddr is the address of the first cache sample which will be used by the interpolator to compute the value of the audio output. It corresponds to the currentInterpolationBase.

The cacheInvalidSize is the number of audio samples in the cache which are not valid with respect to the current address.

The fraction is the fractional part of the current address, which is used to determine the coefficients of interpolation.

The phaseIncrement is the value, which has both a fractional and an integer part, which determines the pitch shifting (or degree of sample rate conversion) of the interpolative playback, and is added to the currentAddr and fraction each sample period to produce an new currentAddr and fraction.

The loopStartAddress is the address of the first sample of a loop in the waveform memory.

The loopEndAddress is the address of the sample after the last sample played in the loop (the sample that is audibly equivalent to loopStartAddress).

The loopInvalidSize is the number of invalid samples below the loopEndAddress when a loop occurred.

The cacheLoopAddr is the loopEndAddress when a loop occurred.

The cacheLoopFlag indicates that the loopInvalidSize and cacheLoopAddr are valid.

The requestFlag indicates that a channel requests that its cache be filled.

The priorityCode is a number from 0 to 3, with 3 being most urgent, indicating how urgently a channel's cache needs to be filled.

The cacheInvalidDoublewords is the size, in doublewords, of the number of audio samples in the cache which are not valid with respect to the current address.

The prioChannel is the number of the channel deemed to be most urgent in its request for service.

The accept signal indicates that a channel has been accepted for cache service by the PCI bus.

The acceptChannel indicates which channel has been accepted for cache service when accept is asserted.

The requestSize is the size of a channel's request for cache service in samples.

The requestAddr is the logical byte address in sound memory at which the current cache service request should begin fetching data to be stored in the cache.

The requestDestAddr is the byte address in the cache to which the first fetched data should be written.

The requestCacheLoopFlag is the value of the channel's cacheLoopFlag when the request parameters were computed.

The sampleSize is the number of bytes in a single sample. It is 1 for monophonic bytes, 2 for monophonic words or stereo interleaved bytes, and 4 for stereo interleaved words.

The channelNumber is the number of the channel currently being processed by the Address Update logic.

The newRequest signal indicates that the request logic has a new set of parameters which indicate a new highest priority request for cache service.

The requestChannel is the channel number associated with the current request parameters.

The acceptDestAddr is the byte address in the cache to which the first fetched data from the accepted request should be written.

The acceptSize is the number of bytes to be transferred to the cache in the accepted request.

The acceptAddr is the logical byte address in waveform memory from which the accepted data will be fetched.

Figure 3:
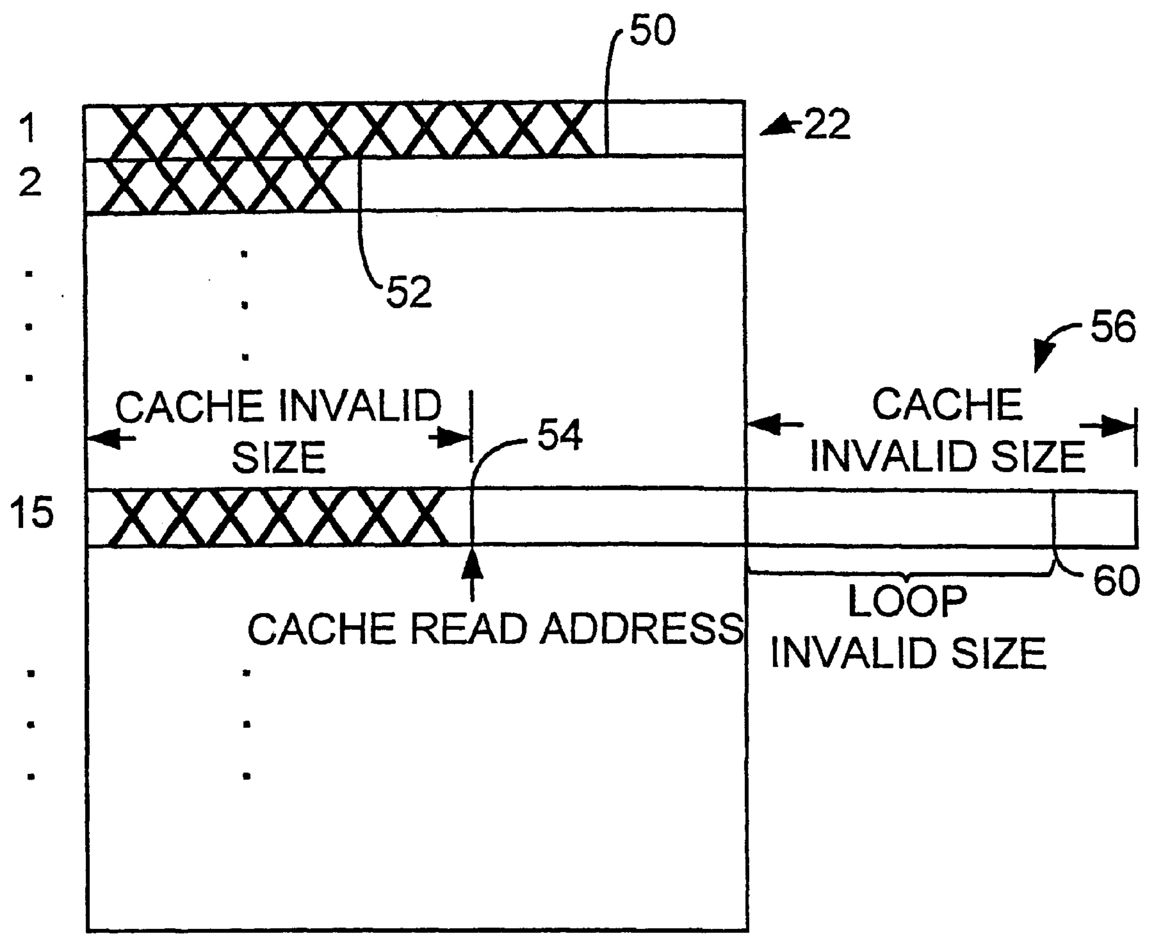
FIG. 3 is a diagram illustrating the cacheInvalidSize and looplnvalidSize of a channel in a cache.

FIG. 3 is a diagram illustrating the refilling of cache 22. A number of channels are illustrated, with the XXs illustrating audio samples which have already been used or played. For example, channel 1 has been played up to a point 50, channel 2 to a point 52, and channel 15 up to a point 54. The portion of each of these channels indicated by the XXs is the "cacheInvalidSize". Points 50, 52 and 54 are located at the cacheReadAddr for their respective channels. For simplicity of illustration, the cacheInvalidSize for all channels starts at the beginning of each channel, but this need not be the case, as the beginning will be moved as the front of each channel begins to be reloaded.

Shown for FIG. 3 is a projection 56 of the cacheInvalidSize beyond the last address in the cache, corresponding to the cache size past a cacheReadAddr 54. CacheReadAddr 54 corresponds to the current audio sample being used or played. In the example shown, portion 56 corresponds to the cacheInvalidSize for channel 15, since the cache size from the cacheReadAddr is necessarily the part to the right of line 54 plus the part to the left.

In the illustration shown, a loopEndAddr occurs at a point 60. As can be seen, loopEndAddr 60 is before the end of the segment 56. Accordingly, a loopInvalidSize is set to be equal to only this portion up to 60 which is actually needed by channel 15 of the cache. This will affect the priority determination for the channel, as discussed below.

Logic Operation

Figure 4:
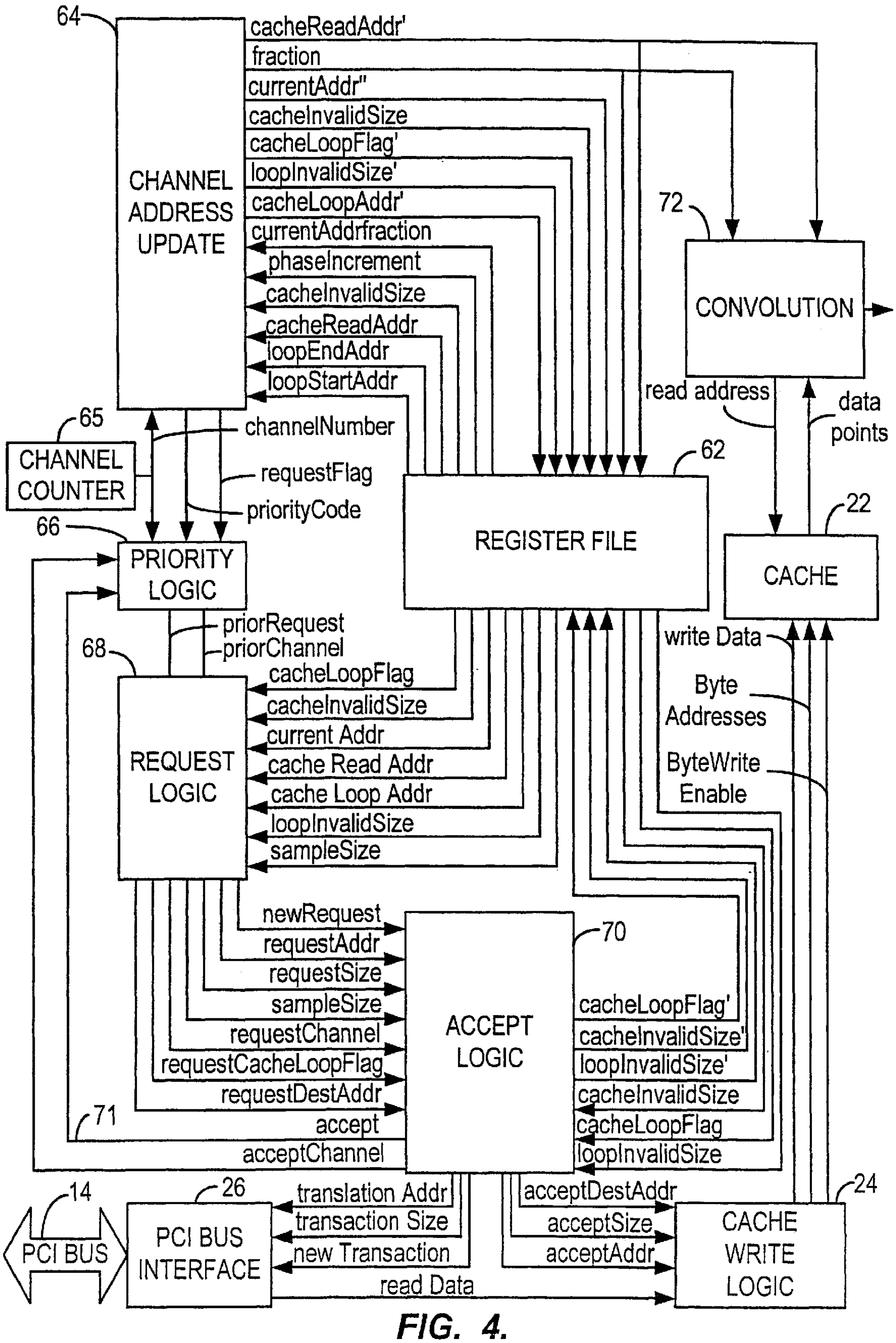
FIG. 4 is a block diagram of the control logic according to the present invention.

FIG. 4 is a diagram illustrating in more detail portions of PCI interface 26 and cache management circuit 27. Shown is a register file 62 which stores the address, sample size, data, etc., for each channel needed to update cache 22. The contents of register file 62 can be written and read by microprocessor 16 to control the recordings that are being played, their loop points, and their pitch shift ratios. Channel address logic 64 calculates and updates the information in register file 62. If a channel requests refilling of its cache, this information is provided to a priority unit 66, along with the channelNumber from channel counter 65. The priority unit determines the priority for servicing of each of the channels. Priority unit 66 will then provide signals to request logic 68, which will then obtain parameters from register file 62 for the highest priority channel, and request bus service. Acceptance logic 70 will pass the request to PCI bus 14 when the bus becomes available, and adjust the parameters in register file 62 accordingly.

When data is received from PCI bus 14, cache write logic 24 will write the data into cache 22, enabling only the needed bytes and shifting them as appropriate to write them into the appropriate locations in cache 22, using the parameter information available from acceptance logic 70.

There are several processes which must operate in the system. The interpolation of the audio output for each channel occurs once each output sample period for each channel. Similarly, the address arithmetic for each channel occurs once each output sample period for each channel. Also, the result of each channel's address arithmetic processing can insert the channel into the priority subsystem. The channels are processed in sequence as indicated by channel counter 65.

The priority subsystem continuously supplies the channel number of the channel which most urgently requires service. The service request logic generates new cache request service parameters each time a new channel number achieves most urgent status. These request service parameters are presented to the cache service acceptance logic.

The cache acceptance logic translates the request service parameters into the information required to actually fetch the requested data from the main waveform memory via the PCI bus and place the data into the cache memory. When use of the PCI bus is granted to the system, the cache acceptance logic accepts the currently supplied request service parameters, and commands the PCI bus interface to fetch the required data. At this time, the acceptance logic also informs the priority logic that the requesting channel has been serviced, and hence can be deleted from the list of channels requiring service. The acceptance logic also updates the address update parameters in register file 62.

Finally, when the PCI bus interface obtains the data from main waveform memory, this data is written into the proper location in the cache memory associated with the channel whose service request was accepted via cache write logic 24.

Each of these related but independent processes will now be described in detail.

For the interpolation of output audio and the channel address processing, each audio channel is processed in sequence. The interpolation algorithm by which the output audio is interpolated has been described in detail in the ’727 and ’990 specifications, and remains the same in the current invention. The algorithm convolves audio data fetched from the cache memory location identified by the cacheReadAddr for the channel with coefficients based on the channel's fraction value and is performed by convolution unit 72.

Address Arithmetic

First, the currentAddr and fraction are updated per the usual algorithm. The currentAddr and fraction are added to the phaseIncrement. If the resulting new currentAddr is equal to or exceeds the loopEndAddr, then the loop size (which is the loopEndAddr less the loopStartAddr) is subtracted from the new currentAddr, otherwise, the new currentAddr as previously computed is used. In pseudo-code:

```
currentAddr.fraction' = currentAddr. fraction + phaseIncrement;
if (currentAddr'> = loopEndAddr) { /* loop case*/
```

-continued

```
    currentAddr" = currentAddr' - (loopEndAddr - loopStartAddr); }
else {
    currentAddr" = currentAddr';}
```

Next, the cacheInvalidSize is increased by the integer part of the sum of the fraction and the phaseIncrement. In other words, the cacheInvalidSize is incremented by the same amount as the currentAddr, exclusive of the loop case:

```
cacheInvalidSize'=cacheInvalidSize+integerPart(phaseIncrement+
    fraction);
```

The cacheReadAddr is similarly increased, modulo the sizeOfCache:

```
cacheReadAddr'=(cacheReadAddr+integerPart(phaseIncrement+
    fraction))%sizeOfCache;
```

During normal operation, when the N point interpolation is performed, N points are fetched from the cache beginning at the cacheReadAddr and successively increasing, modulo sizeOfCache. The interpolation coefficients are based on the fraction.

During normal operation, data is fetched into the cache when the channel's cacheInvalidSize exceeds a minimum level. This level is typically chosen to optimize the burst size for the memory transfer, and in the preferred embodiment this was eight 32 bit doublewords of data. Data is fetched into the cache from the waveform memory location at currentAddress less cacheInvalidSize, and placed in the cache at the cacheReadAddr less cacheInvalidSize. A total of cacheInvalidSize samples are fetched.

The above described mechanism operates properly except when a loop occurs. When a loop occurs, any unfetched data corresponding to invalid cache locations can no longer be found at the locations below the currentAddr, because the currentAddr has now been looped back to the loopStartAddr.

To compensate for this, in the loop case, a new variable, loopInvalidSize is set to the cacheInvalidSize when a loop occurs. The loopInvalidSize indicates the number of samples below the loopEndAddr which must be fetched. It is set, when a loop is detected, to the cacheInvalidSize plus the amount that the loopEndAddr exceeded the currentAddr prior to the new currentAddr computation:

```
/* loop case
    loopInvalidSize'=cacheInvalidSize+loopEndAddr−currentAddr;
```

Now, when a loop occurs, the cache is first filled by transferring loopInvalidSize samples into the cache from the waveform memory location at loopEndAddr less loopInvalidSize, and placed in the cache at the cacheReadAddr less cacheInvalidSize.

Note, however, that if after the loop occurred, the microprocessor 16 were to change the loopEndAddr, the fetch of the cache would not be from the intended location. Hence the loopEndAddr must be copied at the moment of looping into the cacheLoopAddr to protect against this eventuality. Also, a flag called the cacheLoopFlag is set to indicate that the values in loopInvalidSize and cacheLoopAddr are valid:

```
/* loop case
    cacheLoopAddr'=loopEndAddr; cacheLoopFlag'=(loopInvalid-
    Size'>0);
```

Thus the entire channel address processing algorithm can be written:

```
    currentAddr.fraction' = currentAddr.fraction + phaseIncrement;
    cacheInvalidSize' = cacheInvalidSize + integerPart(phaseIncrement + fraction);
cacheReadAddr = (cacheReadAddr + integerPart(phaseIncrement + fraction))%sizeOfCache;
    if (currentAddr' >= loopEndAddr) { /* loop case*/
        loopInvalidSize' = cacheInvalidSize + loopEndAddr − currentAddr;
cacheLoopAddr' = loopEndAddr;
        cacheLoopFlag' = (loopInvalidSize' > 0);
        currentAddr" = currentAddr' − (loopEndAddr − loopStartAddr); }
    else {
        currentAddr" = currentAddr';}
```

Request, Acceptance Logic

Asynchronous to the channel processing described above is the cache service processing. When a channel obtains service, its invalid cache entries will be filled. The time of servicing of a channel's cache is determined by the priority subsystem. Actually there are two servicing of a channel's cache is determined by the priority subsystem. Actually there are two asynchronous processes involved in service: the generation of the service request parameters and the handling of the service acceptance.

Note that accesses of register file 62 by request logic 68 and accept logic 70 are atomic such that the data read and written are never simultaneously modified by channel Address Logic 64. For example, if accept logic 70 were to decrement the cache invalid size of a channel, channel Address Logic 64 is prevented from reading or writing cacheInvalidSize between the read and write by accept logic 70, and vice versa.

When request logic 68 generates the service request parameters for a channel, it first examines the cacheLoopFlag. If the cacheLoopFlag is not set, then the cacheInvalidSize and currentAddr are used to generate the parameters. A maximum of cacheInvalidSize samples are fetched beginning at the logical sample address currentAddr minus cacheInvalidSize. Fewer than cacheInvalidSize samples might be fetched to cause the fetch to end at a doubleword boundary. The samples are placed in the cache starting at sample location cacheReadAddr minus cacheInvalidSize.

If the cacheLoopFlag is set, then the loopInvalidSize and cacheLoopAddr are instead used to generate the parameters. Exactly loopInvalidSize samples are fetched beginning at the logical sample address cacheLoopAddr minus loopInvalidSize. The samples are placed in the cache starting at sample address cacheReadAddr minus cacheInvalidSize.

When the service request is accepted by accept logic 70, the response is determined by both the current value of the cacheLoopFlag of the channel, and the value of cacheLoopFlag that was determined for during request. This is because it is possible that between the time of request parameter generation and acceptance, the cacheLoopFlag might have been set. If the channel's cacheLoopFlag is not set, then cacheInvalidSize is simply decremented by the number of samples in the accepted request. If the channel's cacheLoopFlag is set, and the request's cacheLoopFlag was also set, then cacheInvalidSize is decremented by the number of samples in the accepted request, and the cacheLoopFlag is reset to 0. If the channel's cacheLoopFlag is set but the request's cacheLoopFlag was reset, then both cacheInvalidSize and loopInvalidSize are decremented by the number of samples in the accepted request. It should not be possible for the channel's cacheLoopFlag to be reset and the request's cacheLoopFlag to be set, but if this erroneous condition were to occur, the cacheInvalidSize should be decremented by the number of samples in the accepted request.

Algorithmically, the process performed by request logic 68 and accept logic 70 can be expressed in pseudo-code:

```
cacheRequestParameterGenerate(cacheLoopFlag, cacheInvalidSize, loopInvalidSize,
                                cacheReadAddr, currentAddr, cacheLoopAddr){
        if(1 ==cacheLoopFlag)/* cache loop case */ {
                fetchSize = loopInvalidSize;
                fetchAddr = cacheLoopAddr − loopInvalidSize;
                cacheAddr = cacheReadAddr − cacheInvalidSize;
                }
        else    /* non-loop case */ {
                fetchSize = endAlign(cacheInvalidSize);
                fetchAddr = currentAddr − cacheInvalidSize;
                cacheAddr = cacheReadAddr − cacheInvalidSize;
                }
        }
    cacheAcceptance(requestCacheLoopFlag, cacheLoopFlag, requestSize, cacheInvalidSize,
                                                                loopInvalidSize) {
        cacheInvalidSize = cacheInvalidSize − requestSize;
        if (1 == cacheLoopFlag) /* loop cases */ {
                if(1 == requestCacheLoopFlag) /* normal loop case */ {
                cacheLoopFlag' = 0;
                }
        else /* new loop case */ {
                loopInvalidSize = loopInvalidSize − requestSize
                }
```

-continued

```
    }
}
```

Figure 7:
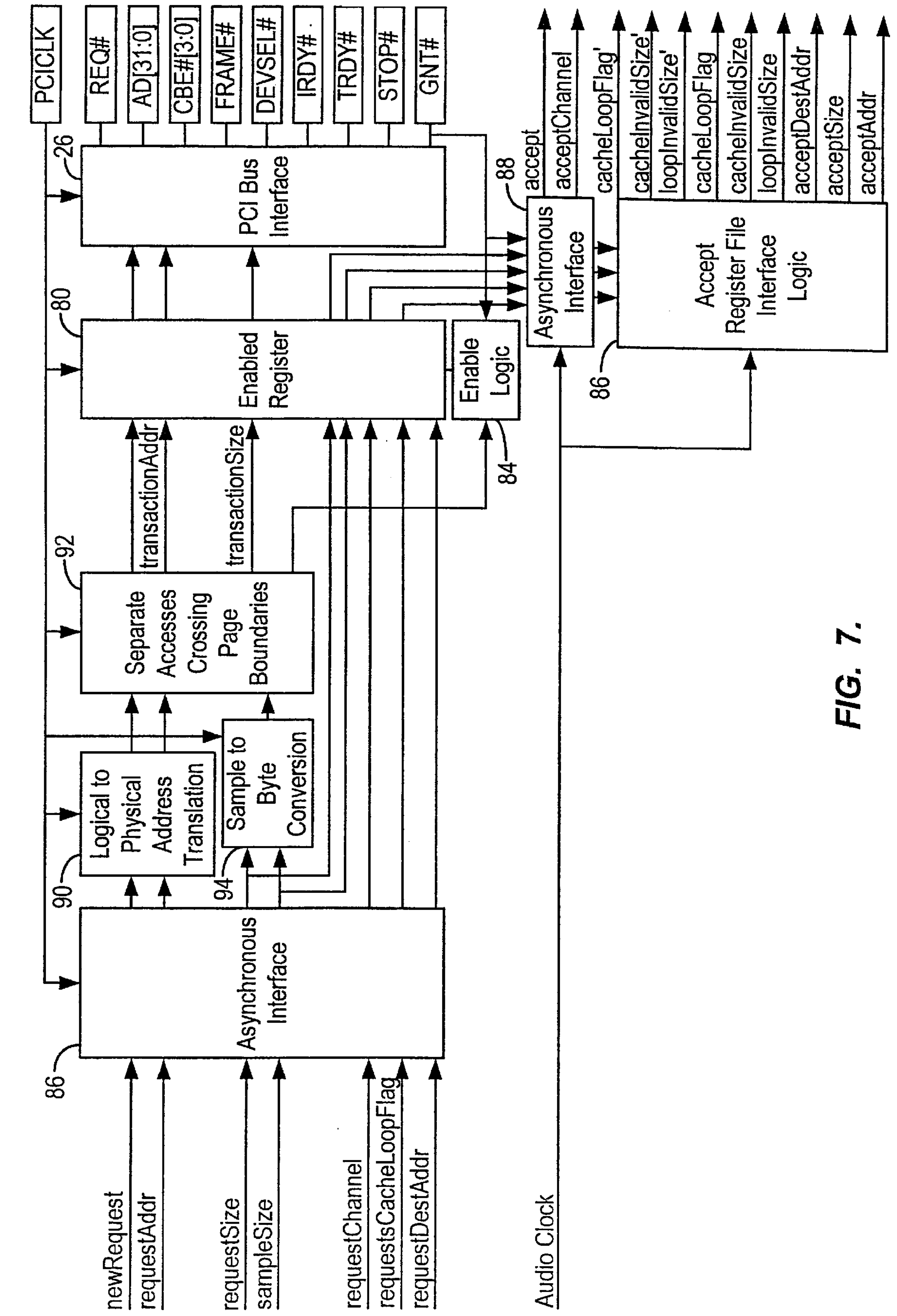
FIG. 7 is a more detailed diagram of the accept logic of FIG. 4.

The cacheAcceptance portion of the above pseudocode is performed in Accept Register File Interface Logic 86 of FIG. 7. Several particular issues are worthy of note. The first is that in the general case, no provision is made for the situation when a second loop occurs before the cache service of the first loop is initiated. The consequence of this fact is that in sound design, loops larger than the sizeOfCache are guaranteed safe because a cache service MUST occur at least once in sizeOfCache samples, lest the cache data be stale and the audio corrupt anyway. Smaller loops may also encounter no error depending on system performance issues.

The second issue is that in the special case that loopEndAddr=loopStartAddr, and multiple loops occur prior to a cache service, correct operation results. Note that cacheInvalidSize accumulates the total requires service size. Also note that because currentAddr minus loopEndAddr keeps increasing at each channel computation, loopInvalidSize remains the same. When a cache service does occur and handles loopInvalidSize, subsequent channel computations will find loopInvalidSize below zero, and will not set cacheLoopFlag. This allows an interrupt to occur on a channel without causing a loop, which may be necessary for double-buffering schemes. By limiting the currentAddr minus loopEndAddr comparison which triggers the loop to only a small region (say twice the maximum phaseIncrement), the situation soon terminates (as described in a patent application entitled "Method and Apparatus for Switching Between Buffers when Receiving Bursty Audio", filed Nov. 13, 1997, and assigned to the same assignee as this application.

Finally, the issue of cache failure should be considered. It is possible that the cacheInvalidSize can become greater than sizeOfCache. In this case, service will attempt to transfer more than sizeOfCache data into the cache. There is no inherent problem with this situation, but of course the transfer of this much data is pointless because it is overwritten in the same transaction.

However, maintaining cacheInvalidSize as a variable which can have a value greater than sizeOfCache is important. If a request is pending when cacheInvalidSize exceeds sizeOfCache, then when that request is accepted, cacheInvalidSize will be decremented by the size of the accepted request. If cacheInvalidSize has been saturated (or worse still wrapped) at sizeOfCache, the decremented cacheInvalidSize will contain an erroneous value. The consequence will be that additional data points will be skipped. Maintaining cacheInvalidSize (and loopInvalidSize) at a minimum of twice sizeOfCache should eliminate this problem under all practical circumstances.

On channel address processing, sampleSize, cacheInvalidSize, and cacheLoopFlag are all known. The cacheLoopFlag indicates that a "loop" service is required. The cacheInvalidSize indicates the size in samples of the sum of any "loop" service and any normal service, and sampleSize indicates if these samples are words or bytes, and if they are interleaved or not. From these parameter values, a requestFlag that indicates that a channel can be serviced, and a priorityCode from 0 to 3 are generated.

Priority Logic

As discussed above, when a loop occurs, a smaller amount of data is requested up to the end of the loop. Because the amount of data is smaller, in order to avoid holding up the processing of the channel, such a loop end situation is given a higher priority in a priority system. The present invention uses a two-stage priority system in one embodiment. In the first stage, it is determined whether cacheLoopFlag is asserted or not. Channels with cacheLoopFlag asserted are given higher priority. In the second stage, priority codes are assigned depending on the number of audio samples required for the channel. Channels with a higher priority due to a loop will be given a higher priority code for the same number of needed audio samples.

In the preferred embodiment, the sizeOfCache is 16 doublewords. In this case, the cacheInvalidSize in samples is converted, based on sampleSize, to a cacheInvalidDoublewords which is the size of the service in doublewords, and the following table shows the priorities generated:

| cacheLoopFlag | cacheInvalidDoublewords | requestFlag | priorityCode |
|---|---|---|---|
| 0 | 0 through 7 | 0 | Don't Care |
| 0 | 8 | 1 | 00 |
| 0 | 9 | 1 | 01 |
| 0 | 10 | 1 | 10 |
| 0 | 11 or more | 1 | 11 |
| 1 | 0 through 4 | 1 | 00 |
| 1 | 5 | 1 | 01 |
| 1 | 6 | 1 | 10 |
| 1 | 7 or more | 1 | 11 |

If the requestFlag for a channel is asserted, it means that the channel can be serviced to fill its cache, and channels of higher priorityCode will be filled first if more than one channel's requestFlag is asserted. This means that under non-loop circumstances, a channel might be serviced when it can accept as few as 8 doublewords of data, and will be maximally rushed when its cache has only 5 doublewords of valid data remaining. When a channel loops, it immediately becomes serviceable, and rushed if it has nine or fewer valid doublewords. These values are set by rule of thumb, and could be varied based on measured performance in a given system.

FIG. 5 illustrates an example of a priorityQueue according to the invention having eight positions. Each of positions 0–7 include a 6-bit channel identifier and a 2-bit priorityCode. FIG. 5 illustrates the channels in decimal for ease of understanding. As can be seen, the highest prioChannel, in position 7, is channel 63 with a priority 11. The next channel, 36, also has a priority 11. The next priority is channel 15 with priority 10, etc.

A priority unit 66 accepts the requestFlag and priorityCode from the channel being processed as indicated by channel counter 65, and based on the values of these inputs for all channels, determines the highest priority channel, prioChannel. There is also a prioRequest output which is asserted whenever any channel is requesting service, and otherwise negated. The priority unit contains a requestRegister with one bit for each channel, and a priorityQueue. In the preferred embodiment, there are 64 channels, and the priorityQueue size has been selected as eight deep. The size of the priorityQueue depends on system performance; a larger queue requires more logic to implement, but will ensure best performance as the capability of the system to service cache requests becomes saturated.

During channel address processing, if a channel asserts its requestFlag, its bit in the requestRegister is set. The requestRegister consists of 64 bits, one for each channel. A priority encoder produces the channel number of the highest numbered set bit in the requestRegister.

If, during channel address processing, requestFlag is asserted and priorityCode is non-zero, the requesting channel may be inserted into the priorityQueue. The priorityQueue comprises eight queue registers, each with a 6 bit channelNumber field and a 2 bit priorityCode field, with queue register 7 being the most urgent and queue register 0 being the least urgent.

On quiescence and reset, all priorityCode fields of the queue contain 00. When a channel asserts its requestFlag with a non-zero priorityCode, its priorityCode value and channel number are simultaneously compared for equality against all priorityCode and channelNumber fields in the priorityQueue. If its priorityCode value is less than or equal to priorityCode field in queue register 0, no action is taken. If its priorityCode value is greater than the priorityCode field in queue register 7, its channel number and priorityCode value are acquired by priorityCode and channelNumber fields in queue register 7 respectively. Otherwise, the channel number and priorityCode value are acquired by next the lower queue register than the lowest queue register whose priorityCode field is greater than or equal to the priorityCode value. When a queue register acquires the channel number and priorityCode value, all lower numbered queue registers acquire the next higher numbered queue registers contents up to and including any queue register whose channel number field is equal to the requesting channel. If no matching channel fields are found, the contents of queue register 0 are discarded. The "impossible" case that a channel number field above the insertion point is found to contain a matching channel number should be handled by inhibiting the insertion.

If no bits are set in the requestRegister, no cache service is required for any channel, and prioRequest is negated. If any bits are set, and the contents of the priority field of queue register 7 are 00, then the channel number indicated by the priority encoder is given as prioChannel, the channel to be serviced, and prioRequest is asserted. If the contents of priority field of queue register 7 are non-zero, then prioChannel is set to the channel field in queue register 7, and prioRequest is asserted.

When a channel is accepted for service, and the accept signal (71) is asserted by Asynchronous Interface 88 of FIG. 7, the acceptance logic will provide its channel number as acceptChannel. The channel's requestRegister bit in the priority unit is reset, and if its channel number is present in any queue register, the queue is purged of the entry and all lower entries moved up one location in the queue. The priorityCode field of queue register 0 is filled with 00.

Logic is simplified if by simultaneous acceptance and request service are precluded by holding off an acceptance purge until the period after requestFlag is valid.

Trimming to PCI Doubleword

If prioRequest is asserted, one or more channels require cache service. In this case, the service request logic determines the parameters for the request based on the prioChannel channel number. The parameters are requestSize, the size of the request in samples, requestAddr, the starting logical address of the request in bytes, requestDestAddr, the starting cache byte destination for the request, and the requestCacheLoopFlag, the cacheLoopFlag for the request. These are determined by accessing the registers for the channel indicated by prioChannel.

If the cacheLoopFlag for the prioChannel is set, then requestCacheLoopFlag is

'1', requestSize is loopInvalidSize. The requestDestAddr is (sampleSize*(cacheReadAddr−cacheInvalidSize)) % (sampleSize*sizeOfCache), requestAddr is sampleSize*(cacheLoopAddr−loopInvalidSize).

If the cacheLoopFlag flag for the channel is not set, then the requestCacheLoopFlag is "0". The requestDestAddr is (sampleSize*(cacheReadAddr−cacheInvalidSize)) % (sampleSize*sizeOfCache).

The requestAddr is sampleSize*(currentAddr−cacheInvalidSize).

The computation of requestSize is more complex in this case, because it is the most common case, and hence should be optimized for efficiency. This is done by trimming the requestSize so as to cause the ending address in host memory to be doubleword aligned. This means that most transfers will be completely doubleword aligned in host memory, thus optimizing transfer bandwidth.

The trimming depends on the sampleSize, the cacheInvalidSize, and the requestAddr. This can be best understood when expressed as a table:

| sampleSize | requestAddr[1:0] | cacheInvalid Size[1:0] | requestSize |
|---|---|---|---|
| 4 bytes | Must be 00 | don't care | cacheInvalidSize |
| 2 bytes | 00 | XO | cacheInvalidSize |
| 2 bytes | 00 | X1 | cacheInvalidSize - 1 |
| 2 bytes | 10 | XO | cacheInvalidSize - 1 |
| 2 bytes | 10 | X1 | cacheInvalidSize |
| 1 byte | 00 | 00 | cacheInvalidSize |
| 1 byte | 00 | 01 | cacheInvalidSize - 1 |
| 1 byte | 00 | 10 | cacheInvalidSize - 2 |
| 1 byte | 00 | 11 | cacheInvalidSize - 3 |
| 1 byte | 01 | 00 | cacheInvalidSize - 1 |
| 1 byte | 01 | 01 | cacheInvalidSize - 2 |
| 1 byte | 01 | 10 | cacheInvalidSize - 3 |
| 1 byte | 01 | 11 | cacheInvalidSize |
| 1 byte | 10 | 00 | cacheInvalidSize - 2 |
| 1 byte | 10 | 01 | cacheInvalidSize - 3 |
| 1 byte | 10 | 10 | cacheInvalidSize |
| 1 byte | 10 | 11 | cacheInvalidSize - 1 |
| 1 byte | 11 | 00 | cacheInvalidSize - 3 |
| 1 byte | 11 | 01 | cacheInvalidSize |
| 1 byte | 11 | 10 | cacheInvalidSize - 1 |
| 1 byte | 11 | 11 | cacheInvalidSize - 2 |

Careful examination of the above will show that the indicated requestSize causes the requestAddr of the subsequent memory access to be doubleword aligned, that is that next requestAddr[1:0]=00. The table can be implemented algorithmically as expressed in the following pseudo-code:

```
if (sampleSize == 4) requestSize = cacheInvalidSize;
else if (sampleSize = 2) {
   if(requestAddr[1] == cacheInvalidSize[0]) requestSize = cacheInvalidSize;
   else requestSize = cacheInvalidSize - 1; }
else/* sampleSize == 1 */ {
   if ((requestAddr + cacheInvalidSize)[1:0] == 00) requestSize = cacheInvalidSize;
   else if ((requestAddr + cacheInvalidSize)[1:0] == 01) requestSize = cacheInvalidSize - 1;
   else if ((requestAddr + cacheInvalidSize)[1:0] == 10) requestSize = cacheInvalidSize - 2;
   else/*((requestAddr + cacheInvalidSize)[1:0] == 11*/requestSize = cacheInvalidSize - 3;}
```

An even more compact notation is:

```
requestSize=cacheInvalidSize-((cacheinvalidSize-
   (requestAddr>>log2(sampleSize)))&3&(3<<log2(sampleSize)));
```

The entire service request parameter logic algorithm may be described in pseudo-code as:

```
if (1 == cacheLoopFlag) /* a fetch of the last data in a loop */ {
            requestCacheLoopFlag = 1;
            requestSize = sampleSize*loopInvalidSize;
            requestDestAddr = sampleSize*( cacheReadAddr - cacheInvalidSize) %
                                          (sampleSize* sizeOfCache);
            requestAddr = sampleSize*(cacheLoopAddr - loopInvalidSize);
            requestChannel = prioChannel;
            }
        else /* 0 == cacheLoopFlag */ {
            requestCacheLoopFlag = 0;
            requestSize = cacheInvalidSize - ((cacheInvalidSize -
(requestAddr>>log2(sampleSize)))&3&(3<<log2(sampleSize)));
            requestDestAddr = sampleSize*( cacheReadAddr - cacheInvalidSize) %
                                             (sampleSize* sizeOfCache);
            requestAddr = sampleSize*(currentAddr - cacheInvalidSize);
            requestChannel = prioChannel;
            }
```

The request logic presents a new requestChannel, requestCacheLoopFlag, requestSize, requestDestAddr, requestAddr and sampleSize each time the priority logic channel output changes. Note that this can also produce requests for the same channel, possibly with different data. The acceptance logic must ensure that a redundant new request is ignored.

Accept Logic

When the request logic presents a new requestChannel, requestCacheLoopFlag, requestSize, requestDestAddr, requestAddr, and sampleSize, the accept logic acquires this data and translates it to a set of PCI transactions. It translates (in logic block 90 of FIG. 7) the requestAddr from a logical sound memory byte address to a physical memory byte address, and divides the access into separate PCI transactions if the request crosses a page boundary (logic block 92 of FIG. 7) (such a translation is described in patent application Ser. No. 08/778,943, filed Jan. 6, 1997, entitled "DMA Device with Local Page Table", and assigned to the same assignee as this application). It also must translate requestSize from samples to bytes using sampleSize (logic block 94 of FIG. 7).

If another set of PCI transactions are being processed when the accept logic completes a translation, the accept logic retains the translated parameters for submission to the PCI bus interface. If a new request is provided to the accept logic while a previous request is being retained, the new request is translated, and can pre-empt the retained previous request. Once a set of PCI transactions is completed, then the PCI transactions associated with another request can begin. Once a set of transactions is passed to the PCI bus interface, it will not be pre-empted.

The accept logic also clears the priority unit (previously described). The accept logic also decrements cacheInvalidSize, and may reset cacheloopFlag and decrement loopInvalidSize.

Writing Data to Cache

Data fetched from host memory is written directly into the indicated sequential cache locations beginning at acceptDestAddr=requestDestAddr, which specifies the byte address in the cache to which the first data is to be written. The acceptSize=sampleSize*requestSize specifies the number of bytes to be written. Note that the first transfer in a request can begin with an arbitrary byte address in host memory, hence the first PCI data transfer may consist of all four, the upper three, upper two or single upper byte in the fetched doubleword. Similarly, the final transfer in the request may consist of a full doubleword, the three lower, two lower, or single lowest byte. All transfers in the request may be transferred into the cache at an arbitrary byte address to which the LS byte of the PCI doubleword will be written. This means that the doubleword from PCI requires barrel shifting, because the LS byte of the doubleword can be written to any byte of the cache, and all four bytes must be capable of being written at once.

Figure 6A:
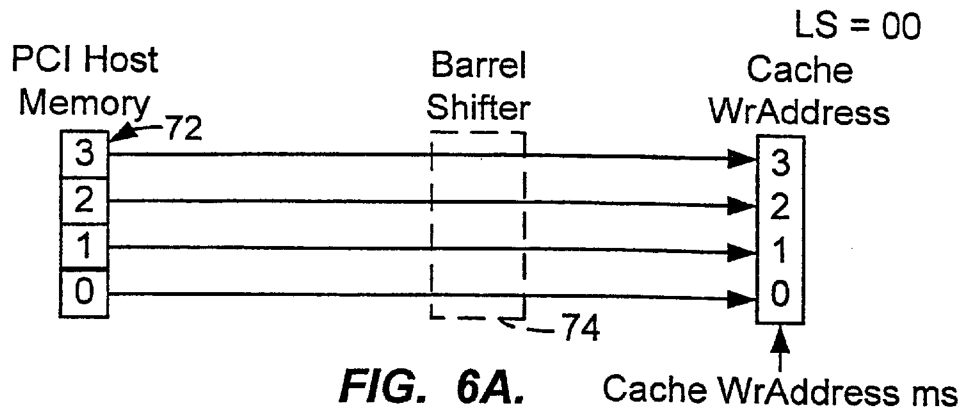
FIGS. 6A–6D are diagrams illustrating the shifting and gating of a doubleword into the cache memory on a byte-wide basis.
Figure 6B:
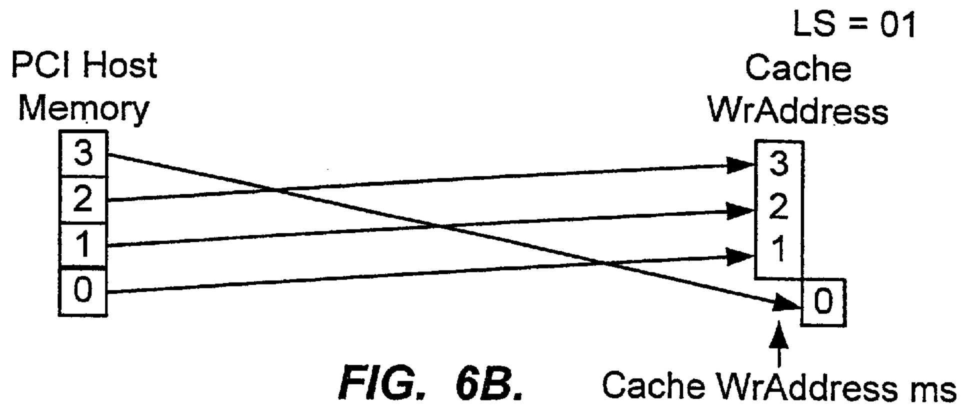
Figure 6C:
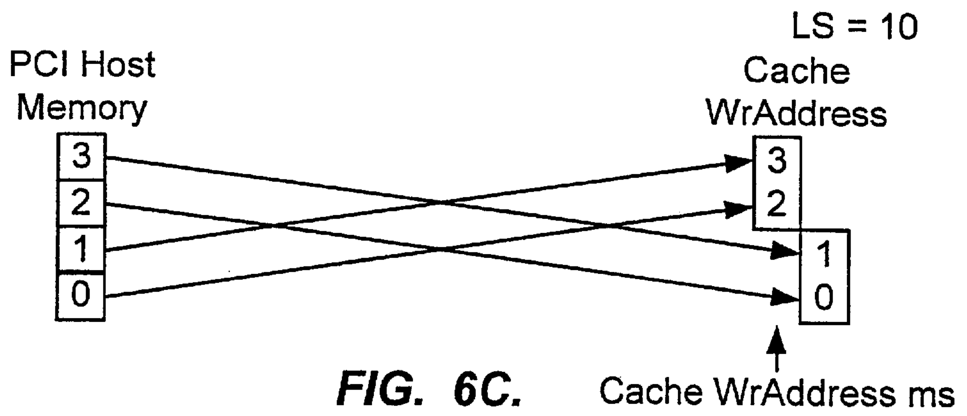
Figure 6D:
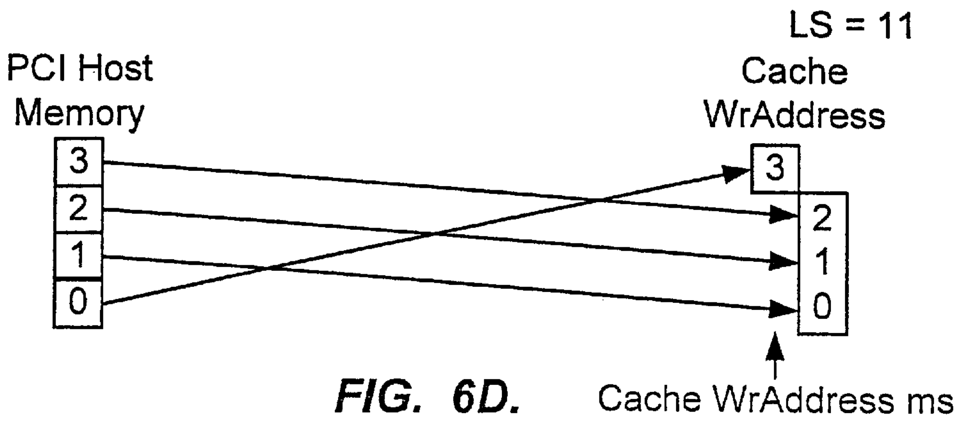

FIGS. 6A–6D illustrate the writing of four bytes of a doubleword 72 into the cache memory using a barrel shifter 74. FIG. 6A illustrates straightforward alignment where all four bytes are written in sequential order. FIGS. 6B–6D illustrate different versions of shifting to provide a different starting address for the bytes written into the cache memory.

The information which is required to determine how the cache memory should be written can be inferred from the acceptSize, acceptDestAddr, and acceptAddr=requestAddr. The cache memory itself comprises M doublewords (M=16 in the preferred embodiment) for each audio channel. But due to the above requirements, the cache memory must consist of four separate byte wide memories, each of which contains M bytes per channel. Each of these byte wide memories has its own address port and write enable input. When data from a PCI transaction is to be written to the cache memory, the address and write enable for each byte wide memory must be computed.

The cacheWriteAddr is the address in the cache to which the LS byte of the PCI bus will be written. The cacheWriteAddr of the first data transfer in a request is acceptDestAddr−acceptAddr[1:0]. In other words, if the acceptAddr is doubleword aligned, then cacheWriteAddr= acceptDestAddr; if not, the cacheWriteAddr is the cache address to which the LS byte associated with the acceptAddr doubleword would have been written has the request been doubleword aligned.

The cacheWriteAddr of subsequent data transfers in a request is the first cacheWriteAddr plus four times the data transfer number (assuming the first transfer is numbered zero). In other words, the cacheWriteAddr is incremented by four each transfer.

To determine the address to be supplied to each byte wide cache RAM element, the cacheWriteAddr must be split into an LS part, cacheWrAddrLS, which is the 2 LS bits of cacheWriteAddr, and cacheWriteAddrMS, which is the remaining bits. The byte wide RAM addresses can then be determined from the following table:

Address for byte wide RAM:
cacheWrAddrLS 0

| | | | | |
|---|---|---|---|---|
| 00 | cacheWrAddrMS | cacheWrAddrMS | cacheWrAddrMS | cacheWrAddrMS |
| 01 | cacheWrAddrMS + 1 | cacheWrAddrMS | cacheWrAddrMS | cacheWrAddrMS |
| 10 | cacheWrAddrMS + 1 | cacheWrAddrMS + 1 | cacheWrAddrMS | cacheWrAddrMS |
| 11 | cacheWrAddrMS + 1 | cacheWrAddrMS + 1 | cacheWrAddrMS + 1 | cacheWrAddrMS |

The byte wide RAM write enables will all be asserted for data transfers other than the first and last transfers of a request. The byte wide RAM write enables for the first transfer of the request are determined by the two LS bits of acceptAddr:

First Transfer Write Enable for byte wide RAM:

| acceptAddr[1:0] | 0 | 1 | 2 | 3 |
|---|---|---|---|---|
| 00 | 1 | 1 | 1 | 1 |
| 01 | 0 | 1 | 1 | 1 |
| 10 | 0 | 0 | 1 | 1 |
| 11 | 0 | 0 | 0 | 1 |

The byte enables for the last doubleword are determined by the sum of the two LS bits of acceptAddr plus the two LS bits of (acceptSize).

Last Transfer Write Enable for byte wide RAM:

| (acceptAddr + acceptSize)[1:0] | 0 | 1 | 2 | 3 |
|---|---|---|---|---|
| 00 | 1 | 1 | 1 | 1 |
| 01 | 1 | 0 | 0 | 0 |
| 10 | 1 | 1 | 0 | 0 |
| 11 | 1 | 1 | 1 | 0 |

In the unlikely case that there is a single data transfer in the request, then the first transfer is also the last transfer, and the byte enables should be simply the AND function of the first and last transfer rules.

One aspect of the current invention is the preemption of one set of request parameters by another higher priority set. This is particularly necessary when the bus which is accessing sample memory is shared with other functions, such as is the case on the PCI bus. In this case, the other functions may take considerable time to perform their processing, precluding access to sample memory for times potentially much longer than an audio output sample period. In this case, one channel may request cache service and have its parameters be presented by the request logic 68 to the accept logic 70, then, prior to the PCI bus becoming available to service this request, another channel may not only request service but advance through its data far enough (due to a high value of the new channel's phaseIncrement) that it needs service urgently and has advanced to the top of the priorityQueue. If the accept logic did not allow preemption, then the channel urgently requiring service might have to wait until the first requesting channel completed its service, and any intervening PCI bus cycles associated with other functions had completed, until it could obtain service.

FIG. 7 is a block diagram of accept logic 70. The accept logic maintains a set of enabled registers 80 which contain all the associated data necessary to perform and acknowledge the acceptance of the PCI requests, which are translated from the most recent parameters provided by the request logic. Whenever these registers contain a valid set of data, the accept logic causes the PCI interface 26 to assert the bus request signal (REQ#) to the PCI bus, indicating that it is ready to initiate a bus master transaction. According to the PCI bus protocol, ownership of the PCI bus will be granted after other currently occurring or higher priority transactions are complete. The accept logic will be signaled that the PCI protocol logic owns the bus by means of the PCI bus master grant signal (GNT#).

A portion of the accept logic must operate synchronously with the clock of the PCI bus PCICLK. According to the PCI bus specification, the PCI bus clock PCICLK operates at an arbitrary rate. Typically the rate is either 25 MHz, 30 MHz or 33 MHz and is set by the computer system. However, because the audio processing must occur at a fixed audio sampling rate, which is typically 48 kHz, the rest of the logic associated with the interpolation system, including the cache memory and the register file, must operate at a clock rate synchronous to the audio sampling rate. In the preferred embodiment, this is 1024 times the sampling rate, or 49.152 MHz. In particular, the register file 62, priority unit 66, request logic 68, and cache memory 22 operate at 49.152 MHz, and the enabled registers 80 in the accept logic must operate at the PCICLK rate, asynchronously to the request logic and cache memory.

The enable logic 84 which supplies the enable signal to the enabled registers constantly monitors the PCI bus grant signal (GNT#) whenever REQ# is being asserted. On the PCICLK cycle when GNT# is first asserted, these enabled registers which contain the translated request logic data are disabled, thus preventing any new request from preempting the request channel once GNT# is asserted. The request associated with this data is now considered accepted, its channel number is supplied via the acceptChannel and accept signals back to priority unit 66, the value of cacheInvalidSize and possibly cacheLoopFlag and loopInvalidSize within the register file are adjusted, and its parameters are passed to the cache write logic to compute the addresses and byte enables for writing the fetched data to cache 22.

Because the registers associated with the translated data must operate at the PCICLK rate in order to be disabled immediately when GNT# is first asserted, and because the audio processing must be performed at a rate based on a fixed clock rate which is not the PCICLK, there must be an asynchronous data interface 86 for all signals which must pass between the circuitry operating at the PCICLK rate and those operating based on the audio clock. Design of asynchronous interfaces is well known to those skilled in the art of digital circuit design.

Due to the asynchronous operations, a higher priority request may develop at any time. However, a higher priority request from asynchronous interface 86 is only clocked into registers 80 in accordance with the PCI clock, and only if GNT# has not been asserted. Thus, the asynchronous interface assures no conflict with the PCI bus timing.

As will be understood by those of skill in the art, the present invention may be embodied in other specific forms without departing from the scope of the invention. Accordingly, the foregoing description is intended to be illustrative, but not limiting, of the scope of the invention which is set forth in the following claims.

What is claimed is:

1. A method for updating a cache memory having multiple channels storing digital audio waveform samples for further processing, by updating with data from a main memory over a bus, comprising:

determining a cache invalid size for a channel corresponding to a number of cache memory locations no longer required for said further processing;

detecting the occurrence of a loop end;

when said cache invalid size extends beyond said loop end, prior to calculation of a new current address, calculating a new current address by subtracting a loop size from said loop end; and requesting data from said main memory across said bus up to said loop end with subsequent data from a loop start address.

2. The method of claim 1 wherein said fetching data step uses a burst of data over a bus.

3. The method of claim 1 wherein fetching subsequent data utilizes a separate bus request.

4. The method of claim 1 comprising:

assigning a priority to a channel in accordance with a first priority scheme when a loop occurs in said channel; and assigning a priority to said channel in accordance with a second priority scheme when no loop occurs in said channel.

5. The method of claim 1 comprising:

providing a set of request parameters for updating a channel in said cache memory in accordance with a priority scheme;

requesting access to said bus; and replacing said set of request parameters in accordance with a change in priority between requesting access to said bus and a grant of access.

6. A cache memory system having multiple channels storing digital audio samples, coupled to a bus, comprising:

channel address logic configured to determine a cache invalid size for a channel corresponding to a number of cache memory locations no longer required for further processing, and to detect the occurrence of a loop end;

request logic configured to generate a request to fetch data corresponding to said cache invalid size only up to said loop end when said cache invalid size extends beyond said loop end, prior to calculation of a new current address, and fetch subsequent data from a loop start address; and logic for calculating a new current address by subtracting a loop size from said loop end.

7. The cache memory system of claim 6 comprising:

a priority unit, coupled to said channel address logic and said request logic, configured to assign a priority to a channel in accordance with a first priority scheme when a loop occurs in said channel, and assign a priority to said channel in accordance with a second priority scheme when no loop occurs in said channel.

8. The cache memory system of claim 7 comprising:

a priority queue coupled to said priority unit.

9. A cache memory system for updating a cache memory storing digital audio waveform samples for multiple channels, using a shared bus, comprising:

request logic configured to provide a set of request parameters for updating a channel in said cache memory in accordance with a priority scheme;

accept logic configured to request access to said shared bus and to replace said set of request parameters in accordance with a change in priority between requesting access to said shared bus and a grant of access.

* * * * *